Nov. 23, 1954   E. G. SCHMIDT ET AL   2,694,901
VALVE OPERATING MECHANISM
Filed May 20, 1949   3 Sheets-Sheet 1
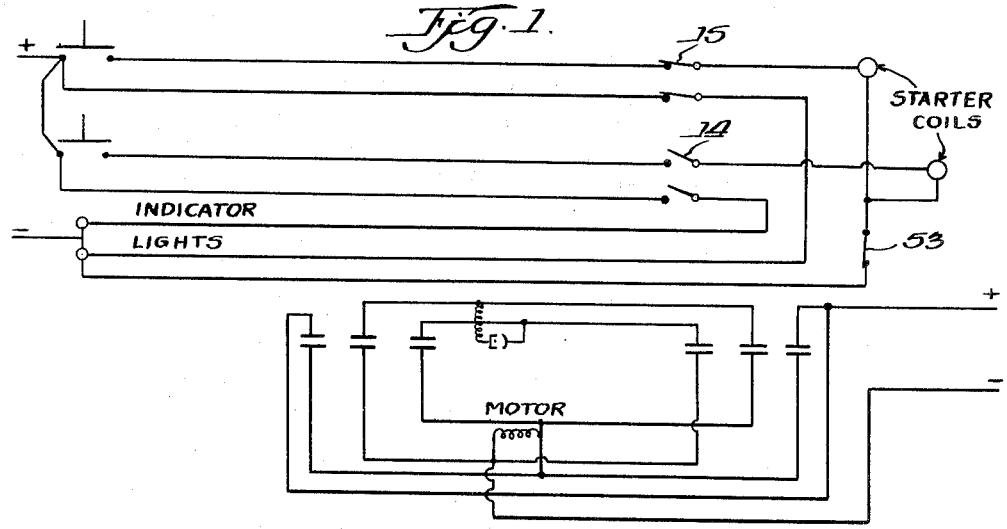
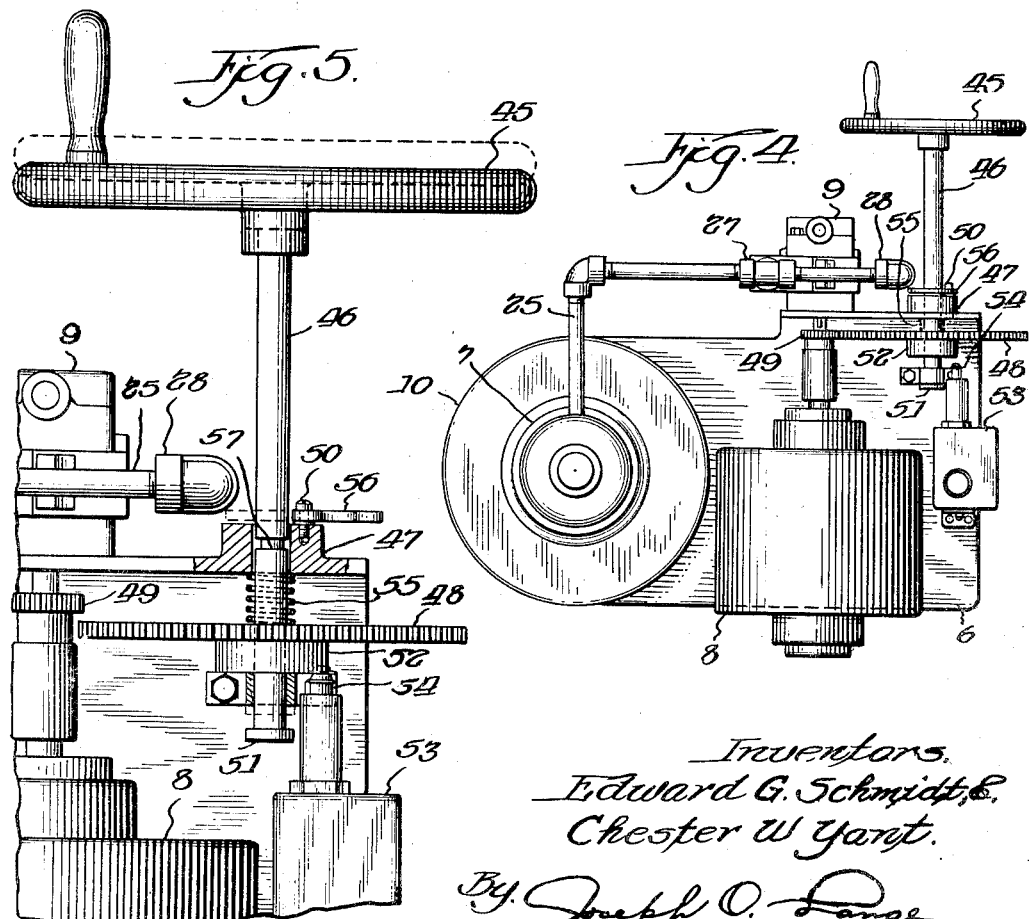
Inventors,
Edward G. Schmidt &
Chester W Yant.
By Joseph O. Lange
Atty.

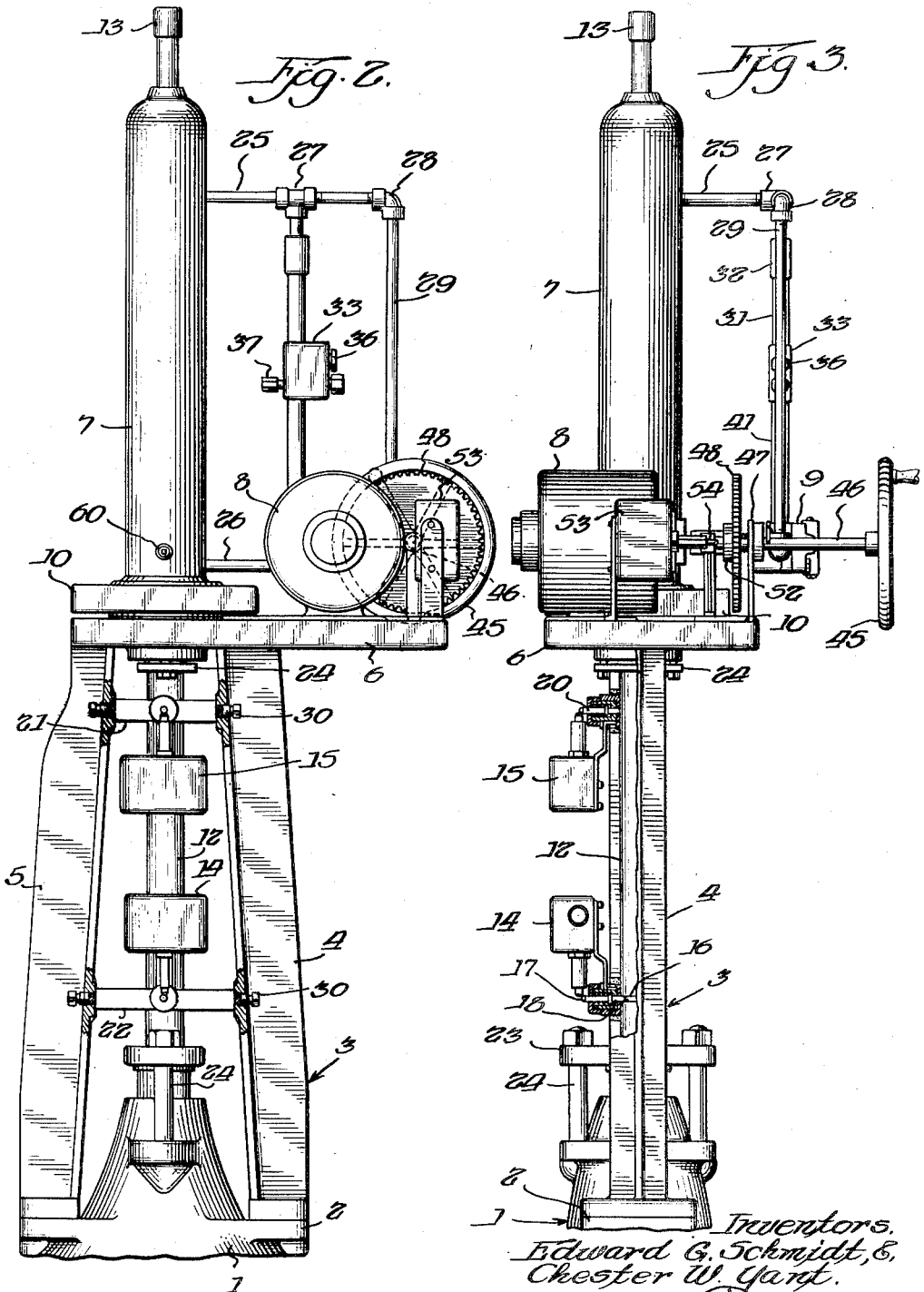

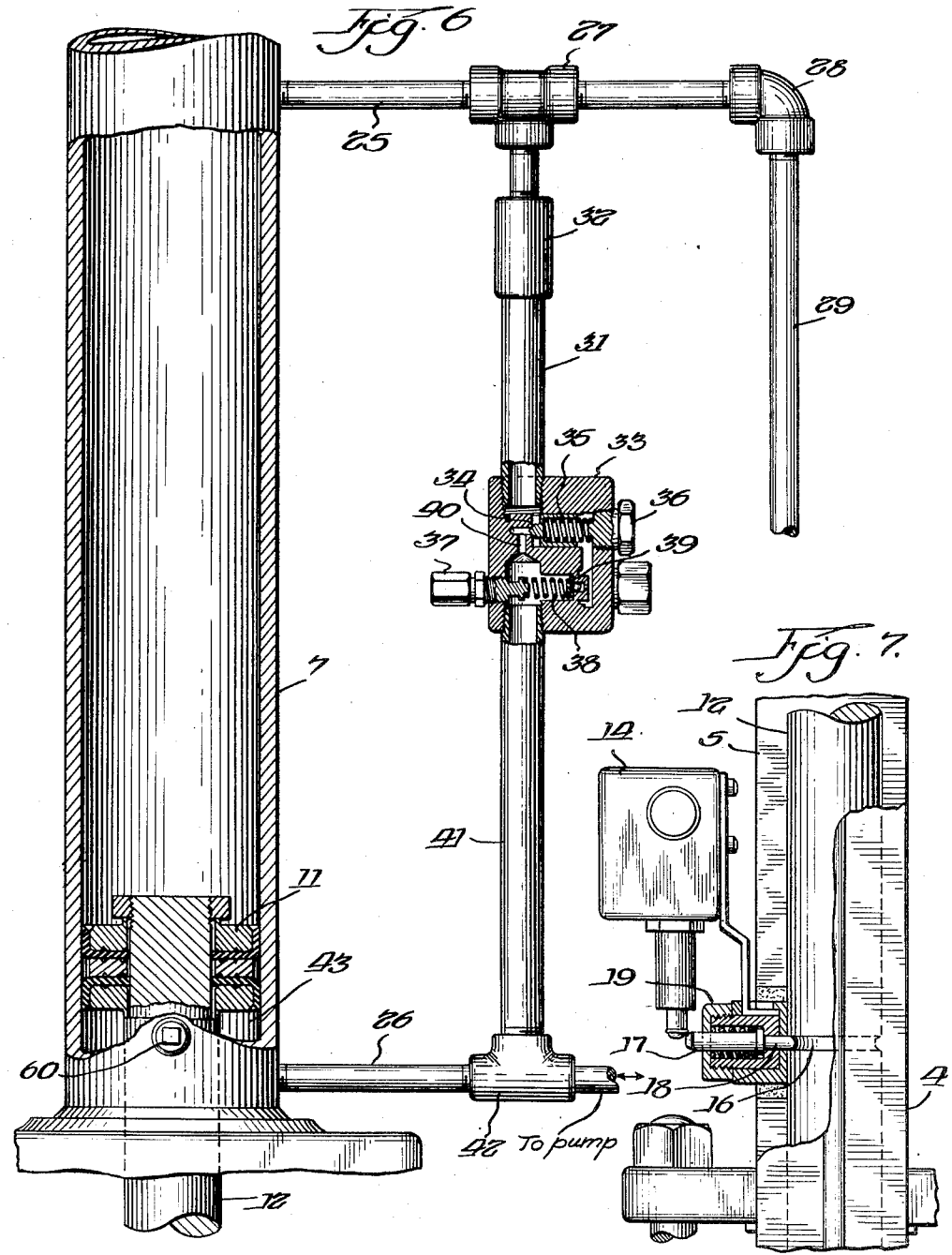

2,694,901

Patented Nov. 23, 1954

2,694,901

VALVE OPERATING MECHANISM

Edward G. Schmidt, La Grange, and Chester W. Yant, Maywood, Ill., assignors to Crane Co., Chicago, Ill., a corporation Application May 20, 1949, Serial No. 94,479

4 Claims. (Cl. 60—52)

This invention relates generally to valve operating mechanisms. More particularly, it is concerned with an hydraulic valve actuator employed in combination with an auxiliary electric motor.

In connection with the operation of valves, it is frequently desirable to operate a valve by remote control mechanism as, for example, in such cases where oil tank farms are involved. While presently available units will operate satisfactorily, they are frequently very expensive and require separate reservoirs and accumulators with selector valves which are costly and have been eliminated from the current invention.

Thus, in addition to providing a more economical device, this invention consists of a self-contained compact hydraulic system for use as a valve actuator and which is suitable for operation by remote control means.

It is another important object of this invention to provide a device which is labor saving and comparatively simple to install and to maintain, thereby constituting a substantial improvement over the previous self-contained systems.

A principal advantage of this system lies in its simplicity and the fact that few component parts are required because of the elimination of the usual reservoir, selector valve, and accumulator.

It is another important object to provide for a remotely actuatable construction in which definite visual indications are provided when the movement of the valve closure member or disc has become restricted, obtainable by means of limit switches which are effective at both extremes of stem travel whereby indicator lights will operate only when the disc or closure member reaches a predetermined desired position. Thus, as hereinafter apparent, if one light does not go out, a definite indication will be given either that the movement of the disc has become restricted, or that the motor is still running and that the valve or unit therefore requires servicing.

Other equally important objects and advantages will become more readily apparent upon proceeding with the following description read in light of the accompanying drawings, in which Fig. 1 is a wiring diagram for the circuit showing the electrical system for the hydraulic operator employed with the auxiliary electric motor.

Fig. 2 is a general assembly view of the hydraulic motor actuator with the auxiliary electric motor drive constituting the present invention.

Fig. 3 is a general assembly view taken transversely to that described in connection with Fig. 2.

Fig. 4 is a plan exterior view of the assembly constituting our invention.

Fig. 5 is a fragmentary exterior view of the manually operated switch engaging mechanism.

Fig. 6 is a fragmentary sectional assembly of the operating cylinder and its associated piping.

Fig. 7 is a fragmentary sectional view showing the limit switch and detent assembly.

Similar reference numerals refer to similar parts throughout the several views.

Referring now to Fig. 2, on the yoke pads of the valve bonnet fragmentarily shown, and suitably attached by means of bolts (not shown), is the actuator supporting member, generally designated 3, which consists of the oppositely disposed arms 4 and 5 for purposes hereinafter described, and having at their upper limits the platform 6 upon which is supported hydraulic cylinder 7, the reversible motor 8 and the pump 9 directly connected thereto. Extending below the support platform 6 and attached to the piston 11, as more clearly shown in Fig. 6, is a conventional stem 12. The lowermost end of the stem 12 is attached to a valve closure member (not shown) and the cylinder 7 is, of course, made sufficiently long to provide for the desired lift of the valve. At the same time, sufficient space is provided for the oil required for the operation of the hydraulic system as hereinafter described at length, the oil being introduced to the top of the piston 11 by means of the filler cap 13 (Figs. 2 and 3). With the valve stem and piston in the position shown in Figs. 2 and 3, the valve should be assumed as being in the fully-closed position.

Adjustably mounted in relation to the supporting arms 4 and 5 as hereinafter explained in greater detail is the double pole lower limit switch 14 and the double pole upper limit switch 15, the distance between the two limit switches representing substantially the lift of the valve. As shown more clearly in Fig. 7, the stem 12 is provided with an annular indentation or groove designated 16, such indentation being engageable as shown in Fig. 7 by the detent 17, as at 18, the detent preferably being spring loaded and contained within the combined bearing and cap member 19; the said latter combined member is fixedly mounted upon the spanning members 21 and 22. The limit switches 14 and 15 by means of the brackets illustrated are fastened to and supported by the spanning members 22 and 21 respectively. Thus, when the valve closure member (not shown) reaches the closed position, the detent being adjustably mounted on the supporting arms 4 and 5 enters into or engages the stem indentation 16, as illustrated, thereby to hold the stem and disc in position, and also simultaneously actuate the limit switch to open the electrical circuit to the motor causing the motor and the pump 9 to stop, and as shown in the wiring diagrams of Fig. 1, shuts off the "open" light. In the meantime, at the upper end thereof and coupled with the upper limit switch 15, the detent 20 (see Fig. 3) is in the retracted position with both poles of the limit switch closed to make contact to light the "closed" indicating light and to drive the motor in the opposite direction as soon as the push-button for actuating said motor is operated. Such motor push-buttons for the limit switches may of course be suitably applied on a control panel or any other preferred manner. The motor operates the hydraulic pump 9, to transfer oil from one end of the cylinder to the other, thus causing the piston 11 to be raised or lowered depending upon the direction of rotation of the motor and the pump.

As shown more clearly in Fig. 2, the respective detents are provided with the cross-connecting bracket at upper and lower spanning members 21 and 22, and a conventional stuffing box is arranged for the valve stem, as at 23, pressure being applied to the packing (not shown) by means of the conventional gland flange bolts 24. The lower portion of the cylinder 7 below the platform 6 may be similarly packed to prevent leakage past the stem by means of the said stuffing box. As shown more clearly in Fig. 6, at the upper and lower portions of the cylinder 7, the respective inlet piping 25 and 26 is provided having the T connection 27 connected to elbow 28, the lower portion of the elbow 28 being connected directly to the pump 9, with the piping designated 29. The T 42 is connected to the pump 9 as indicated.

As indicated more clearly in Fig. 6, between the respective inlets 25 and 26 communicating with the cylinder 7 and depending from the T 27 is the cross connection 31 coupled to the T by means of the coupling 32 and having attached thereto a relief valve, generally designated 33. The relief valve 33 is constructed as indicated so as to have an adjustable spring load applied to the pressure responsive member 34, through the spring 35 and the adjusting screw 36. The lower portion of the relief valve 33 is also provided with a similar pressure means or check valve oppositely seated and also is spring loaded and adjustable in a manner similar as previously described, the check valve functioning to prevent reverse flow. The adjusting mechanism is shown respectively by the adjusting screw 37, the coiled spring 38, and the seated disc 39. Below the relief valve 33, the tubing 31 continues beyond the valve 33 as the tubing 41, entering the T 42, and thence being connected by means of the tubing 26 with the chamber 43 below the piston 11.

In connection with the functioning of the relief valve 33, it should, of course, be understood that when the piston 11 moves upwardly, the main valve is being opened and that when the piston is moved downwardly, the valve is being closed.

It is therefore desirable in connection with valve operation to require greater power in unseating a valve, as, for example, particularly when a gate valve having a wedge seat is to be actuated; that is, greater power in opening the valve is required than that normally used in closing the valve. For this purpose, the relief valve 33 used in the line next to the discharge from the pump when closing the main valve is adjusted so as to open at a predetermined pressure considerably below the pressure used to unseat the main valve. Therefore, as the pump 9 is operated to seat the main valve, and fluid pressure equal to the set pressure of the relief valve 33 is reached, the oil in the line, or other fluid carried, is forced under pressure through the relief valve 33 and back into the pump, thereby establishing the desired decreased seating load.

In connection with establishing the alignment of the detents 7 and 20 with the respective limit switches 14 and 15, it should be noted that in either direction of travel of the piston 11 and the valve stem 12, part of the force of the piston then applicable is used to break the holding force of the detents at either end of the travel of the valve and to force it back into the recesses of the spanning members 21 and 22, thereby to close the respective limit switches 14 and 15 in preparation for the reverse stroke or movement in the opposite direction. For this reason, it is desirable to be able to adjust the detent position, as indicated, by means of the spanning members 21 and 22 and their respective adjusting screws 30, on the yoke arms 4 and 5 to compensate for manufacturing variations in making valve parts and to establish motor control and holding force at the proper position of the closure member travel for axial movement of the stem and piston. This is accomplished by means of the adjusting screws 30 or other suitable frictional gripping means. It should be noted that the inner facing surfaces of the pads in which the said adjusting screws are mounted are parallel to the stem axis to permit the respective spanning members 21 and 22 to be transversely moved up or down when such adjustment is required.

In connection with the operation by electro-hydraulic means and referring to the wiring diagram, the valve is considered to be in the closed position, as illustrated, the double pole upper limit switch is closed and therefore ready for the operation to open the valve. As far as the indicator lights are concerned, the "closed" light is illuminated by virtue of the completed circuit. The "open" push-button is operated and electric current is transmitted through the starter switch into the motor capacitor, thereby starting the unit in operation. As the stem rises, the detent pin 18 leaves the annular groove 16. The stem 12 in so doing actuates the closing limit switch, thereby setting the circuit for opposite direction of travel and causing the "open" indicator light to become lighted. When the valve closure member reaches its uppermost point of travel, that is, that the stem and piston have reached the limit of their upward travel, the upper detent pin enters the said groove and opens the upper limit switch to thereby break the motor circuit and shut off the "closed" light. The system is then ready for reverse operation (closing) by reason of the lower limit switch being closed. The procedure will be reversed when the "closed" push-button switch is then operated.

So as to facilitate safe manual operation, a unique arrangement is employed also embodying the use of a limit switch. Directing attention to Figs. 4 and 5, should there be any failure in the electrical power whereby it would be impossible to actuate the electric motor since the motor driven pump is directly operated by the motor 8, a manually operated mechanism is used employing the handwheel 45 having the operating stem 46 attached thereto and supported within the bearing 27. Adjacent the support 47, the stem is provided with a gear 48 engageable upon predetermined movement with the pinion 49, the latter being an integral part of the shaft on the pump 9. As indicated by dotted lines, the handwheel 45 and its operating stem 46 are axially movable to a limited degree. The head at the end of the stem, as designated at 51 (Fig. 5), limits the upward movement of the stem 46 so that the gear 48 thereby engages the pinion 49 in proper position. It will be noted that in so doing that the hub portion 52 below the gear 48 moves from the end of the contact shaft on the single pole limit switch 53, the contact shaft being designated 54. Actuating the limit switch 53 will open the circuit to the motor which eliminates the possibility of actuating the motor and thereby prevents injury to the operator during hand operation. The coil spring 55, immediately upon release of the handwheel, will cause the actuating stem 46 and the gear 48 to be moved toward the switch 53 and the hub 52 to actuate the contact shaft 54 of the limit switch 53, to thereby close the motor circuit and permit the motor to again be operated electrically. In connection with establishing the axial position of the stem 46, it should be noted that the hasp 56 is pivotally mounted, as at 50, upon the upper surface of support 47. When the shaft 46 is in its maximum upper position, the pivotable hasp 56 may engage the collar or grooved portion 57 of the shaft 46, thereby to hold the shaft in this position until manually released.

In operation, it will therefore be apparent that oil or other liquid is introduced to the cylinder 7, and then with the actuation of the motor 8 and the pump 9, fluid flow is initiated so as to move the piston 11 within the cylinder 7. The respective detents engaging the annular groove 16 will thus cause the limit switches 14 and 15 to be actuated in due course, and thereby indicate on the lighting panel, remotely located from the valve, the true position of the closure member with respect to whether the valve is open or closed. Of course, the relief valve 33 being duly set, it will permit a certain load to be applied with respect to the pressure of the actuating fluid when the valve is being opened as distinguished from the load being applied when the valve is being closed. The adjusting screws 36 and 37 will allow for the proper compression of the springs 35 and 38, respectively, in holding the relief closure members to their seats.

Manual operating mechanisms described in connection with Figs. 4 and 5 also permit hand operation in the event that power fails, rotation being obtained by means of meshing the respective gears 48 and 49 in the manner previously described, thereby to drive through the pump and allow for the pressure to operate the piston in the same manner as if the same were being motor operated.

It will be apparent, of course, that only a single preferred embodiment has been described, and that the invention of course is capable of taking form in many different varieties of applications without departing from the spirit of the invention or the scope of the appended claims.

We claim:

1. In an electro-hydraulic valve actuating mechanism or the like, the combination with a reciprocally movable stem, of a cylinder cooperating with an end portion of the stem, a piston movable within the said cylinder and connected with an end portion of the stem, a source of pressure for actuating said piston, electrically operated means for energizing the said source of pressure, conduit means therefor communicating with upper and lower internal portions of the said cylinder, a plurality of limit switches having adjustable detent means for controlling the end limits of movement of the said piston, the said electrically operated means being interconnected with the said limit switches, electric indicator means cooperating with said switches, the said stem having annularly disposed means engageable with the adjustable detent means of said limit switches for predeterminately actuating the said switches at end limits of movement of the said stem thereby to indicate through the electric indicator means the axial position of the stem, the positioning of said detent means being adjustable axially relative to end limits of reciprocating movement of the stem and piston.

2. In an electro-hydraulic valve actuating mechanism or the like, the combination with a reciprocally movable stem, of a cylinder cooperating with an end portion of the stem, a piston reciprocally movable within the said cylinder and connected with an end portion of the stem, a source of pressure for said piston, electrically operated means for energizing the said source of pressure, conduit means therefor communicating with upper and lower internal portions of the said cylinder, upper and lower limit switches having adjustable detents for controlling the extent of reciprocating movement of the said piston, the said electrically operated means being interconnected with the said limit switches, electric indicator means cooperating with said switches, the said stem having annular means for cooperation with end portions of the adjustable detents of said limit switches for predeterminately actuating the said switches thereby to indicate through said electric indicator means the axial position of the reciprocally movable stem, the said detents being resiliently mounted and being slidably movable transversely to the path of movement of the piston and stem.

3. In an electro-hydraulic valve actuating mechanism or the like, the combination of a reciprocally movable stem, a cylinder cooperating with an end portion of the said stem, a piston reciprocally movable within the said cylinder and engageable with an end portion of the stem, a source of pressure for said piston, electrically operated means for energizing the said source of pressure, conduit means therefor communicating with upper and lower internal portions of the said cylinder, upper and lower limit switches having adjustably positioned detents for controlling the end limits of movement of the said piston, the said electrically operated means being interconnected with the said limit switches, electric indicator means cooperating with said limit switches, the said stem having annular grooves contacting with the detents of said switches for predeterminately actuating the said switches thereby to indicate through the electric indicator means the axial position of the stem, one of the said adjustable detents being released from its grooved contact with the said stem upon initial axial movement of the stem when the stem is being moved in one direction, the said release of the detent means effecting the setting of the lower limit switch thereby to set the electrical circuit for the opposite direction of piston travel.

4. In an electro-hydraulic valve actuating mechanism or the like for a positively seating device, the combination of a reciprocally movable stem, a cylinder cooperating with an end portion of the stem, a piston movable within the said cylinder and connected with an end portion of the stem, a source of pressure for said piston, electrically operated means for energizing the said source of pressure, valved conduit means therefor communicating with upper and lower internal portions of the said cylinder, adjustable detents cooperating with said piston, upper and lower limit switches cooperating with said adjustable detents for controlling the end limits of movement of the said piston, the said electrically operated means being interconnected with the said limit switches, electric indicator means cooperating with said limit switches, the said stem having annular means contacting the detent of said switches for predeterminately actuating the said limit switches thereby to indicate through the electric indicator means the axial position of the stem, at least a portion of the valved conduit means including relief means biased to allow for relatively greater fluid pressure to be applied to said piston during the initial movement thereof in one direction than that applied during the opposite movement thereof.

References Cited in the file of this patent

UNITED STATES PATENTS

| Number | Name | Date |
|---|---|---|
| 854,712 | Bassett | May 28, 1907 |
| 1,616,841 | Beebe | Feb. 8, 1927 |
| 1,791,013 | Rudolph | Feb. 3, 1931 |
| 1,948,951 | Walker | Feb. 27, 1934 |
| 2,051,052 | Morgan | Aug. 18, 1936 |
| 2,331,109 | De Ganahl | Oct. 5, 1943 |
| 2,430,175 | Hornbostel | Nov. 4, 1947 |
| 2,543,759 | Cannon et al. | Mar. 6, 1951 |